United States Patent [19]

Südbeck et al.

[11] Patent Number: 4,514,153

[45] Date of Patent: Apr. 30, 1985

[54] ROTARY VANE PUMP WITH CLUTCH

[75] Inventors: Rainer Südbeck, Duisburg; Hans Baumgartner, Viersen, both of Fed. Rep. of Germany

[73] Assignee: Pierburg GmbH & Co. KG., Neuss, Fed. Rep. of Germany

[21] Appl. No.: 374,882

[22] Filed: May 4, 1982

[30] Foreign Application Priority Data

Jul. 18, 1981 [DE] Fed. Rep. of Germany ....... 3128432

[51] Int. Cl.³ .................... F04C 2/00; F04C 11/00; F04C 27/00; F16D 25/02
[52] U.S. Cl. ..................... 418/69; 418/137; 192/85 AA
[58] Field of Search ................ 418/69, 136, 137, 138, 418/209, 212, 213, 241; 192/85 AA, 85 CA; 417/223

[56] References Cited

U.S. PATENT DOCUMENTS

| | | | |
|---|---|---|---|
| 560,314 | 5/1896 | Fertig | 418/241 |
| 2,068,062 | 1/1937 | Metten | 192/85 AA |
| 2,486,467 | 11/1949 | Devine et al. | 418/215 |
| 2,587,230 | 2/1952 | Schaad | 192/85 AA |
| 2,720,298 | 10/1955 | Youngren et al. | 192/85 AA |
| 3,370,785 | 2/1968 | Pasek et al. | 418/137 X |
| 3,398,884 | 8/1968 | Kaatz et al. | 418/152 |
| 3,537,432 | 11/1970 | Jordaan | 418/215 X |
| 3,771,902 | 11/1973 | Bandy | 418/241 X |
| 4,342,547 | 8/1982 | Yamada et al. | 418/DIG. 1 |

FOREIGN PATENT DOCUMENTS

| | | | |
|---|---|---|---|
| 48439 | 2/1938 | France | 417/223 |
| 557366 | 11/1943 | United Kingdom | 418/69 |

Primary Examiner—John J. Vrablik
Assistant Examiner—T. Olds
Attorney, Agent, or Firm—Toren, McGeady, Stanger, Goldberg & Kiel

[57] ABSTRACT

In a vane pump a hollow cylindrical rotor (7) is mounted for rotation about its axis within a housing (1) and is arranged to be driven by a belt driven pulley (54) mounted on one end (19) of the rotor. Extending eccentrically within the rotor (7) is a shaft (11) which has its opposite ends (10) and (24) fixed in passages (9) and (23) respectively in the end portions (5) and (15) of the housing (1) so that the shaft (11) is not rotatable. The vanes (27) of the pump are rotatably mounted on the shaft (11) so that they extend axially of the shaft and project radially through axially extending openings in the cylindrical wall of the rotor (7). The vanes (27) are thereby rotated on the shaft (11) when the rotor is driven, and the portions of the vanes projecting through the cylindrical wall of the rotor sweep a pump chamber (13) surrounding a portion of the rotor to convey fluid from an inlet to an outlet of the pump.

13 Claims, 4 Drawing Figures

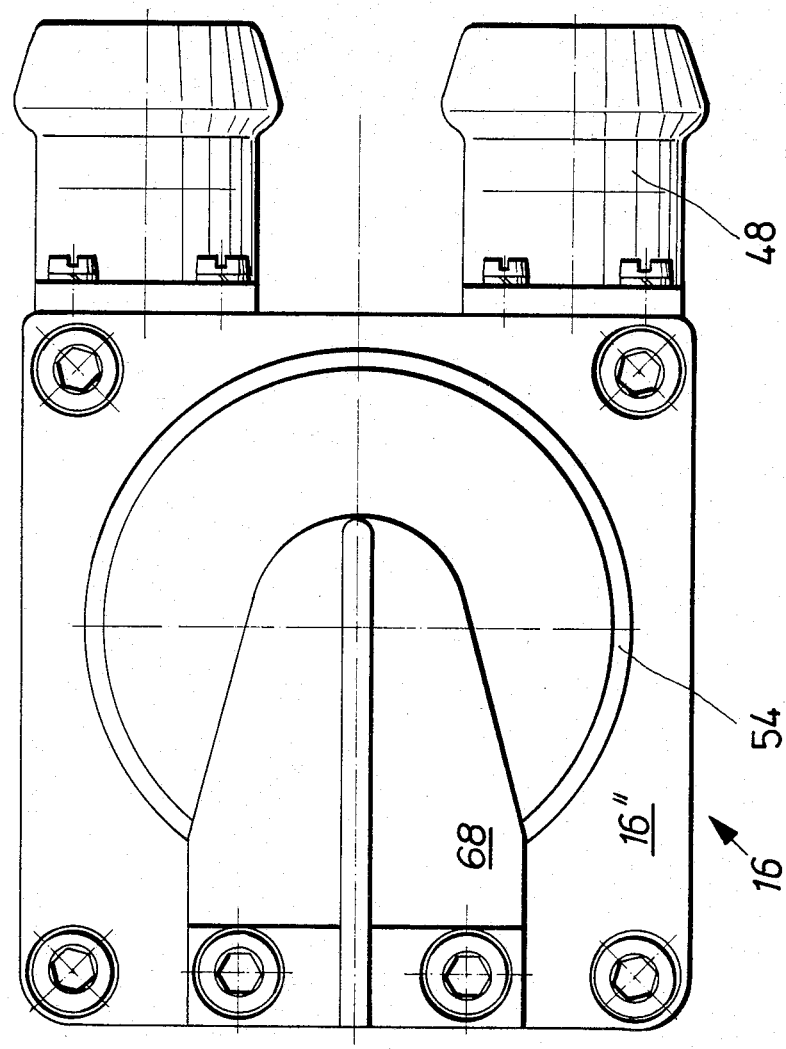

ROTARY VANE PUMP WITH CLUTCH

This invention relates to vane pumps of the kind comprising a housing, a hollow cylindrical rotor mounted for rotation about its axis within the housing, driving means at one end of the housing for rotating the rotor, a vane shaft mounted so that it extends eccentrically within the rotor, a number of rotatable vanes mounted on the vane shaft so that they extend axially on the shaft and project radially through openings in the cylindrical wall of the rotor whereby the vanes are rotated about the shaft axis when the rotor is rotated, a pump chamber within the housing and which is swept by the vanes as they are rotated by the rotor, and an inlet and an outlet for the fluid to be pumped communicating with the pump chamber. The invention also relates to a method of operating such pumps.

Vane pumps of this type are used, amongst other things, as superchargers in internal combustion engines, and at a high number of revolutions are use for conveying or compressing fluids, mainly gases. Of particular importance in the application of these pumps are features such as very high rotational speeds and favourable dimensions, particularly in reduced height, as well as near as possible pulsation-free fluid conveyance at the highest possible pressures.

It is known in vane pumps to arrange two or three vanes symmetrically on a vane shaft which is mounted in the housing at only one end, i.e. the end opposite the driven end of the rotor. For reducing the friction losses between the rotary vanes and the other moving parts of the pump, a small air gap is provided between the radially outer ends of the vanes and the wall of the pump chamber, and sealing strips made, for example, of a carbonaceous material are provided along the openings in the rotor through which the vanes project. The mounting of the vane shaft at one end only is necessary because the rotor is sealed at its driven end, and this requires the length of the shaft to be limited, which in turn requires a relatively large housing diameter in order to achieve a satisfactory output. However, a large diameter, particularly in the construction of vehicles, is regarded as disadvantageous since it prevents the construction of flat engine fronts which are aerodynamically favourable. Furthermore, the centrifugal forces and the acceleration in the oscillations which are inherent in rotary vane pumps having vanes with large diameters are of such proportions that the upper limit of rotational speed is restricted in an undesirable manner.

Another vane pump of the kind described is known from DE-OS No. 20 00 968. In this pump the rotary vane shaft may be mounted at both ends, and particularly when the drive of the rotor is not coaxially arranged with the rotor but is laterally offset, for example by means of cogs, the shaft is mounted carefully to by freely rotatable. However, it has been shown that even with arrangements such as these, because of the unavoidable flexing of the rotary vane shaft, relatively large air gaps are necessary between the rotary vanes and the pump housing which therefore result in low efficiency. A high degree of sealing between the outer edges of the rotary vanes and the wall of the pump chamber is desirable, especially at low revolutions when the shaft flexing is small as a result of the relatively small centrifugal forces. Hitherto, at low revolutions the sealing gap has had to be relatively large in order to prevent friction losses caused by shaft flexing at high revolutions.

It is the aim of the present invention to provide a vane pump of the kind described which overcomes the above disadvantages, and to this end the vane shaft of the pump is non-rotatably mounted in the pump housing at both ends of the shaft so that only the vanes are driven by the rotor.

In this way the maximum antiflexing property of the vane shaft is achieved, and the shaft may therefore be constructed to be longer and thinner, and therefore lighter, than has hitherto been possible. As a result of the longer length, the diameter of the vanes and the pump chamber may be reduced, so that it is possible to achieve higher rotational speeds without causing an increase in centrifugal forces and an acceleration in oscillations. The length of the non-rotatably mounted shaft ends should be as large as possible, for which a rigid moulding is particularly recommended. Because of the relatively high demands, the bearings for the rotary vanes on the shaft should preferably be roller bearings.

Preferably the driving means comprises a driving wheel which is mounted coaxially with respect to the rotor and which is adapted to be driven from an external drive unit, and the driving end portion of the housing is of split construction having a junction at which there is a lateral aperture for a connection between the driving wheel and the external drive unit. This makes possible the use of known types of suitable belt pulleys as the driving wheel, and in this case the changing of the belt may be made easier if the split driving end portion of the housing comprises a releasable bracket which overlaps the corresponding end of the rotor from the outside towards the inside of the rotor.

A further extension of the vane shaft and a more efficient support may be achieved by means of at least one support disc which is non-rotatably mounted inside the rotor and which has an eccentric bore through which the vane shaft passes and is supported thereby. Particularly suitable for this purpose is a support disc such as described in DE-OS No. 20 00 968 with reference to FIG. 2 thereof. The rotary bearing for the disc in the rotor may be directly pressed into the rotor or into an intermediate concentric shoulder within the rotor. Surprisingly it has been found that the support effect of such a disc on the vane shaft is approximately the same in all directions so that stress on one end of the rotating bearing is prevented. Torsional forces acting on the vane shaft also are surprisingly small.

According to another aspect of the invention, the pump chamber may be divided into axially separated sections by at least one separating wall externally of the rotor. This wall may also serve to support the rotor, and together with the aforementioned internal support discs forms a particularly effective support of the rotating parts in very long rotary vane pumps.

These rotary vane pumps are particularly easy to construct, and may have a variety of uses, particularly when the pump chamber is divided into sections and there are different inlets and outlets for fluids in different sections. This enables different sections or groups of different sections to be operated as separate pump units in the same rotary vane pump. For example, if the pump is for use in supercharged I.C. engines which additionally have secondary air inlet means, a division of the sections for throughputs in a ratio of from about 7:3 to 19:1 is particularly advantageous.

Particularly good operation of rotary vane pumps in accordance with the invention in certain areas of use may be achieved with an unsymmetrical arrangement of the vanes with respect to the transverse axis of the vane shaft.

The pulsations often generated in rotary vane pumps may be eliminated by arranging the vanes in axially separated groups of vanes which are angularly displaced with respect to each other about the axis of the vane shaft.

In a rotary vane pump with three vanes in the groups the displacement of each group of vanes along the vane shaft by an angle of approximately 60° to the adjacent group of vanes was found to be particularly advantageous. However, measures such as these also result in a reduction of the synchronism and the dynamic load of a three vane shaft.

The mechanical working hitherto required in the manufacture of sealing strip guides for the vane openings of rotors made from aluminium castings may be made obsolete by producing a rotor with integral sealing strip guide means manufactured by an extrusion moulding process.

A particularly simple construction of the vanes which reduces centrifugal forces and at the same time reduces or at least maintains at a constant level the friction forces with respect to the sealing strip guides may be achieved by manufacturing the vanes from a metal plated synthetic material. A spring steel, such as that used for leaf springs, or a hard chrome plating is the preferred plating metal. This results in a considerable reduction in the friction of the plastic vanes on the packing strips while at the same time maintaining a low weight.

An improvement of the handling and the variety of uses of the vane pump in accordance with the invention may be achieved if the driving means at the driving end of the housing includes a clutch for engaging and disengaging the driving wheel with the rotor. The clutch preferably comprises a follower member which is mounted coaxially with the driving wheel so that it is axially displaceable into and out of engagement with the driving wheel and is rotatably fixed to the rotor, a thrust bearing carried by the follower member and having a cap, a spring biassing the follower member out of engagement with the driving wheel, a movable cover operatively connected to the thrust bearing cap and enclosing a chamber between the cover and a fixed part, and a connection for the supply of pneumatic pressure to the chamber for operating the clutch. Such a clutch is particularly simple and easy and reliable in operation and avoids slipping in the disengaged state.

The follower member may be rotatably fixed to the rotor by axially extending pins on one of these two parts fitting slidably in bores in the other parts. Such an arrangement provides the necessary play in the axial direction.

A very simple and easy to construct operative connection between the thrust bearing cap and the movable cover of the chamber which is subjected to pneumatic pressure may be achieved by a lever acting between a mounting on the cap and a mounting on the cover. However, in an alternative arrangement the movable cover may be rigidly connected to the thrust bearing cap.

A very compact form of the pneumatically operated clutch may be achieved if the pneumatic pressure supply connection comprises a nozzle situated in a recess in the cover of the pressure chamber.

The connection between the movable cover and the fixed part of the clutch chamber preferably comprises a flat membrane since this is particularly well suited to withstand the pressure stresses to which opposite sides are subjected, and since it also serves to further reduce the size of the chamber. Naturally other membranes, for example roller membranes, are also suitable for this purpose.

The operation of the pneumatic clutch is influenced in a particularly advantageous manner when the spring acts on the follower member in the opposite direction to the pneumatic pressure.

An additional leaf spring acting between the movable cover of the pressure chamber and its fixed part makes it possible to achieve reliable coupling and decoupling with only relatively little pneumatic pressure. Preferably the leaf spring is a spring washer.

A special operating method for a rotary vane pump in accordance with the invention, providing flexibility of use, comprises operating the pump optionally as an air motor. The reversal of the drive direction when operating in this manner is made possible only by the mounting of the vane shaft at both ends. As an example, when the pump is provided as a super charger in an I.C. engine, the pump may be driven by the intake air of the I.C. engine at engine speeds at which super charging is undesirable and this drive force used to operate other units, for example a secondary air pump, and thus at the same time also provides throttling means.

A particularly advantageous operating method may be realised when the pump chamber is divided into a plurality of sections having different inlets and outlets. In this case, one of the sections may be used as an air motor which drives the remaining sections as a pump. This enables, for example, the super charger and secondary air pump for an I.C. engine to be integrated in one unit whereby, through appropriate control of the gas channels and with the aid of a pre-set vane pump clutch, a maximum degree of flexibility can be achieved.

Examples of the rotary vane pump in accordance with the invention will now be described with reference to the accompanying drawings, in which:

FIG. 3b is an end view of a modified form of the pump shown in FIG. 3a.

Figure 1:
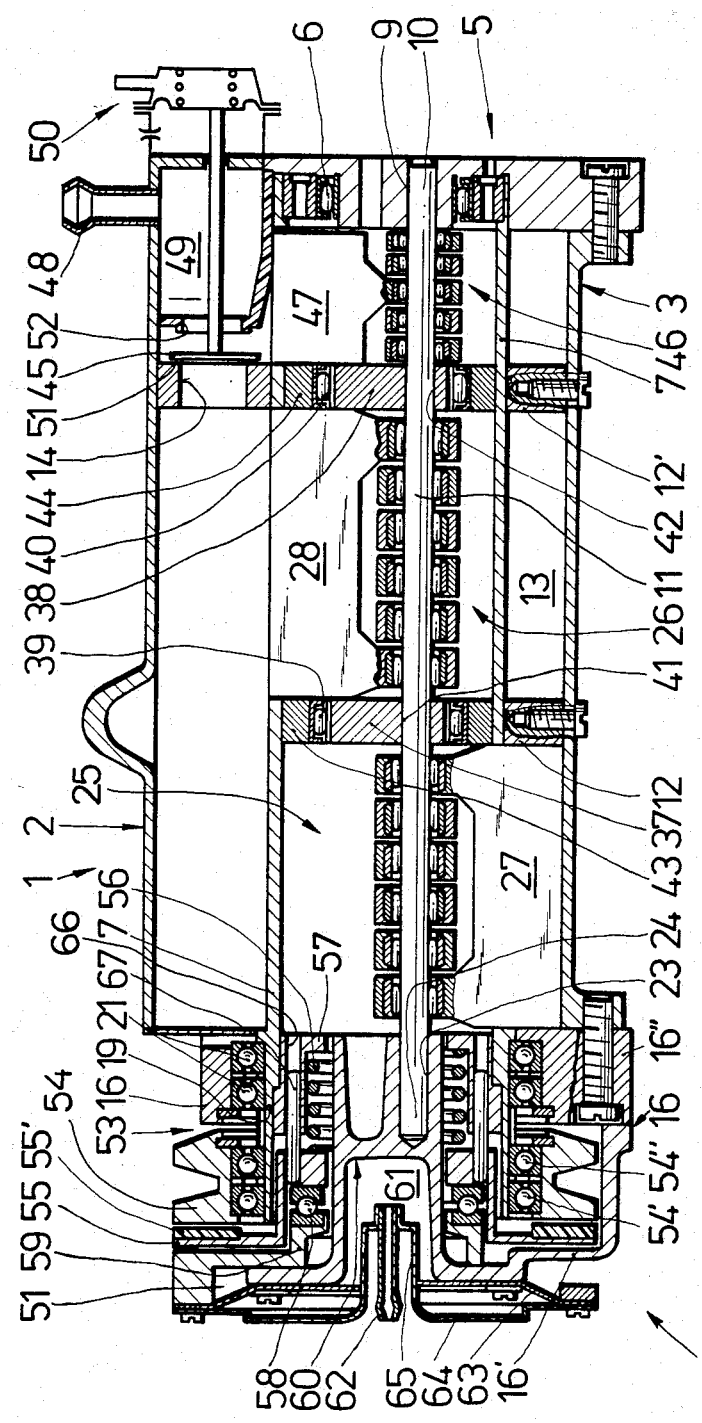
FIG. 1 is a longitudinal section through a first example.

The pump illustrated in FIG. 1 has a pump housing 1 comprising segments 2 and 3 and opposite end portions 5 and 15. The segment 3 has two nozzles arranged side by side, only one of which, 48, is shown in FIG. 1, which function as fluid inlet and outlet depending on the direction of rotation. The end portion 5 of the housing comprises an end plate having on its inner side a rotary bearing 6 for a cylindrical rotor 7, and a bore 9 located eccentrically with respect to the rotor axis 8 for receiving as a press fit the end 10 of a vane shaft 11.

On the vane shaft 11 there are arranged three groups 25, 26 and 46 of vanes, each group comprising three symmetrically arranged vanes 27, 28 or 47 rotatably mounted on the shaft 11. The vanes 28 and 47 of the groups 26 and 46 are displaced by approximately 60° with respect to the vanes 27 of the group 25. The vanes project through axially extending openings in the wall of the rotor 7 and are driven by the rotor to sweep a pump chamber 13 located eccentrically outside the rotor.

The vane shaft 11 is supported within the rotor 7 by two discs 37, 38 having eccentric bores 41, 42 through which the shaft 11 extends, and needle roller bearings 39, 40 located between the periphery of the discs and annular shoulders 43, 44 on the inside of the rotor. The discs separate the groups of vanes 25, 26 and 46 from each other. Outside the rotor 7, the pump chamber 13 is divided by a pair of separating walls 12, 12' located in the same radial planes as the discs 37, 38. However, the pump chamber sections which are swept by the vane groups 25 and 26 communicate with common inlet and outlet chambers so that these two groups of rotary vanes form a single pump unit. The third rotary vane group 46 sweeps a pump chamber section which has its own inlet and outlet chambers, only the outlet chamber 49 and nozzle 48 being shown. However, whether the output from the vane group 46 is delivered to the chamber 49 is determined by a valve member 45 which is moved by a control device 50 either to open a port 52 into the chamber 49 and to close a port 14 leading to the outlet chamber of the pump unit 25, 26, or vice versa. Consequently, it will be understood that the rotary vane group 46 can either work together with the rotary vane groups 25 and 26 as a pump, or separately therefrom.

The rotor 7 is driven at its end 19 adjacent the end portion 15 of the housing by means of a V-belt pulley 54 which is arranged to be drivingly coupled and uncoupled from the rotor by a pneumatically operated clutch. The end 19 of the rotor is rotatably mounted with respect to housing 1 by means of a double roller, ball or needle bearing 21, and the driving pulley 54 is mounted for free rotation on the end 19 of the rotor by almost friction free ball bearings 54', 54". The end portion 15 of the housing comprises a supporting assembly 16 of split construction (parts 16' and 16") which provides an aperture 53 eccentric with respect to the rotor axis 8 for the V-belt (not shown) which drives the pulley 54. The part 16' has a portion which projects into the open end of the rotor and receives the end 24 of the vane shaft 11 in a bore 23 so that the shaft 11 is restrained from rotating.

The clutch comprises a follower disc 55 mounted co-axially with the pulley 54 so that the disc 55 is axially displaceable with respect to the rotor end 19 in such a way that a lining 55' of the disc 55 can be engaged with or disengaged from the pulley 54. A spring 56 located co-axially within the rotor end 19 acts on the one hand against a shoulder 57 of the rotor and on the other hand against the follower disc 55 in such a way that, when a corresponding counterforce is lacking, the follower disc 55 is pushed away from the pulley 54. At the opposite end of the disc 55 from the spring 56, the follower disc 55 has an axial thrust bearing 58 and a bearing cap 59. The thrust bearing cap 59 together with the thrust bearing 58 and the follower disc 55 is axially displaceable.

The supporting assembly 16 at the end 15 of the housing provides a fixed end 60 of a chamber 61 which has a pressure connection nozzle 62 which, in use, will be connected to a gas pressure container (not shown). The pressure connecting nozzle 62 is located in a central recess 65 in a cover 64 and a membrane 63 which close and seal the chamber 61.

The thrust bearing cap 59 and the cover 64 may each have a holder for a lever for operatively connecting the cap 59 and the cover 64 to each other in such a way that when movement of the thrust bearing cap 59 occurs relative to the rotor end 19 the cover 64 is moved in the same direction as the thrust bearing cap 59. Conversely, when the cover 64 is moved axially, the thrust bearing cap 59 will be moved in the same direction by the lever. However, it is preferred to use a rigid connection between the thrust bearing cap 59 and the cover 64, for example a screw connection as shown.

A low pressure of sufficient magnitude supplied through the nozzle 62 to the chamber 61 will move the cover 64 towards the fixed end 60 and displace the thrust bearing cap 59 towards the right by overcoming the force of the spring 56. This brings the lining 55' of the follower disc 55 into operative contact with the pulley 54 so that the disc 55 will be driven by the pulley. Since the follower disc 55 is rotationally fixed to the rotor end 19, the rotor is thus rotationally connected to the pulley 54. Apart from splines, also suitable for connecting the disc 55 to the rotor end 19 are a combination of axial drillings 66 and pins 67 engaging therein. The drillings 66 are shown provided in the rotor end 19 and the matching pins carried by the disc 55, but the opposite arrangement may be used if preferred. Such a connection between pins and drillings ensures a locked connection in the rotational direction and permits relative axial movement when appropriately dimensioned. When uncoupling the vane pump from the driving pulley 54 the low pressure in the chamber 61 is reduced so that the spring 56 is again able to push the follower disc 55 away. This process may also be assisted by using gas pipes and valves (not shown) to adjust the pressure inside the chamber 61 to a specific excess pressure.

Although not shown, between the fixed end 60 and the cover 64 of the chamber 61 there may be provided a leaf spring, which may be in the form of a spring washer, arranged in such a way that it assists in the coupling and uncoupling process. When the leaf spring is a spring washer, it can also serve to safely retain the clutch in one or other of its two extreme positions. Finally, it is also possible, instead of the flat membrane 63 shown, to use a so-called roller membrane. However, flat membranes are more suitable than roller membranes for withstanding the repeated changes in pressure stresses that take place during operation.

This construction of the clutch is particularly sturdy and simple to manufacture, and ensures in particular the required reduction in frictional forces.

Figure 2:
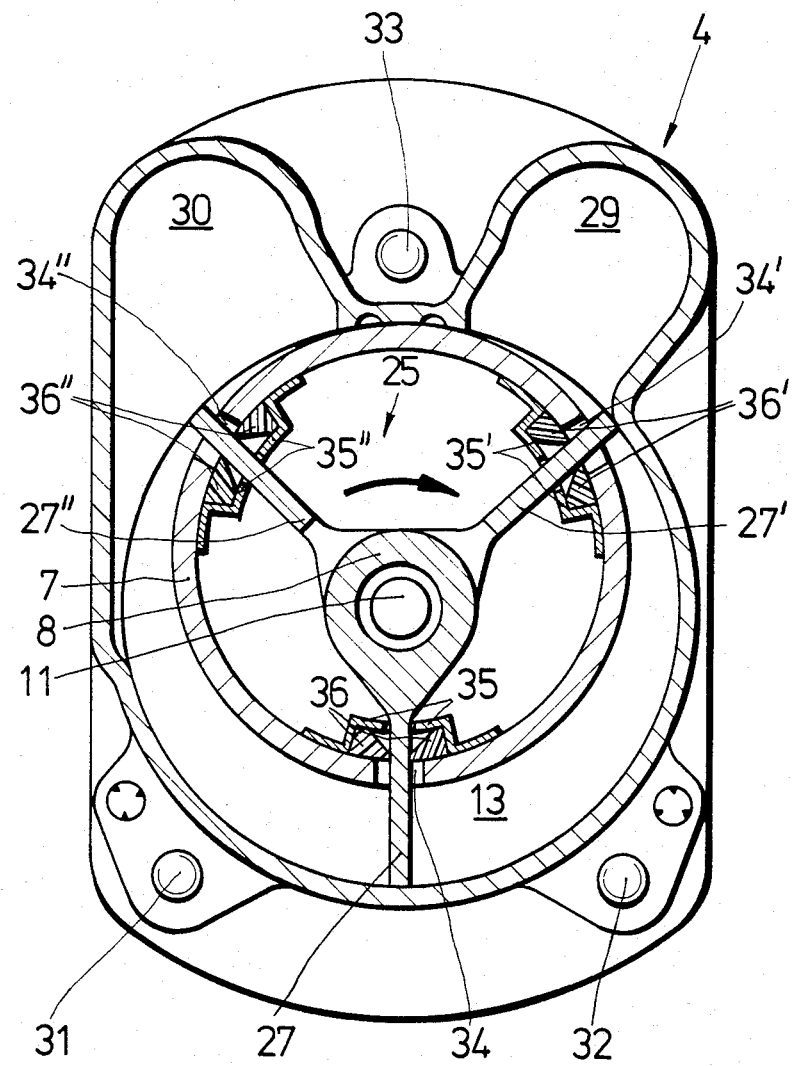
FIG. 2 is a radial cross-section through an example which is similar to that of FIG. 1.

In the example shown in FIG. 2, the rotor is driven to rotate in the clockwise direction, and the area 29 represents an inlet chamber and the area 30 represents an outlet chamber. By means of threaded pins 31, 32, and 33, the segments 2 and 3 of the housing are connected together in a simple manner. The axial openings in the rotor 7 through which the vanes project are shown at 34, 34' and 34", each with a pair of packing strip guide channels 35, 35' and 35" and a pair of packing strips 36, 36' and 36". The vanes 27, 27' and 27" are symmetrically arranged on the vane shaft 11.

Figure 3A:
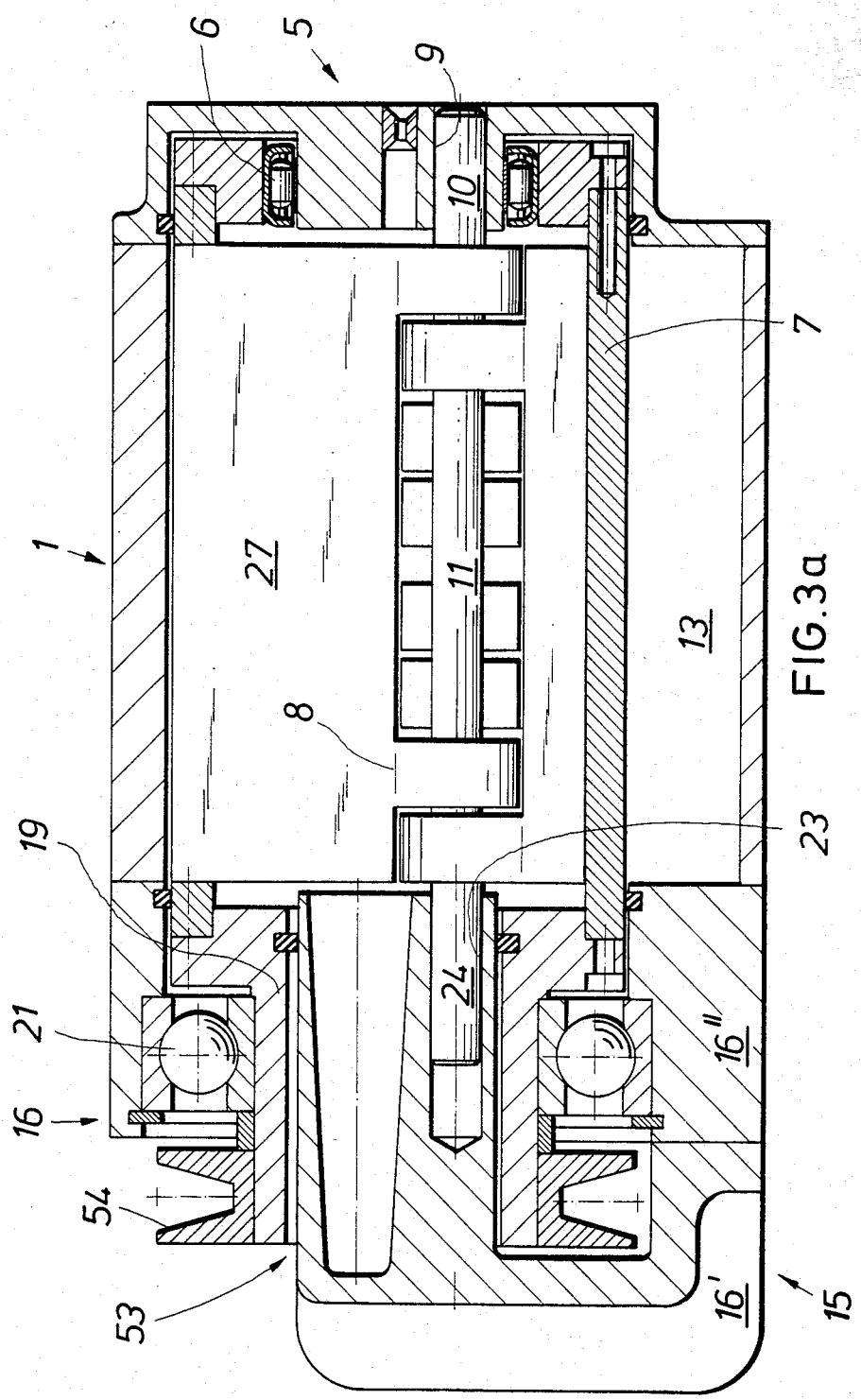
FIG. 3a is a longitudinal cross-section through a further example.

In the pump shown in FIG. 3a four vanes 27 are arranged on the vane shaft 11 for free rotation and are driven by the rotor 7 to sweep a single pump chamber 13. The support assembly 16 at the drive end 15 of the housing is again in two segments 16' and 16", and overlaps the rotor end 19 from outside towards the inside of the rotor 7 and therefore produces a force-locking connection between the housing 1 and the end 24 of the vane shaft 11. In FIG. 3b the segment 16' of FIG. 3a is shown as a releasable bracket 68, which enables the driving V-belt to be changed without difficulty.

We claim:

1. In a vane pump comprising a pump housing, a hollow cylindrical rotor mounted for rotation about its own axis within said housing, said rotor having a cylindrical wall containing a plurality of circumferentially spaced and axially extending openings, a driving means at one end of said housing for rotating said rotor, a vane shaft mounted to extend eccentrically within said rotor, a plurality of rotatable vanes mounted on said vane shaft whereby said vanes extend axially on said shaft and project radially through said openings in said cylindrical wall of said rotor, said vanes thereby being rotated about the axis of said vane shaft when said rotor is rotated, means defining a pump chamber within said housing which is swept by said vanes as said vanes are rotated by said rotor, and inlet and outlet means for the fluid to be pumped communicating with said pump chamber, the improvement wherein said vane shaft has opposite ends with each said opposite end non-rotatably and directly mounted in said pump housing whereby only said vanes are driven by said rotor, said driving means includes a driving wheel mounted coaxially with respect to said rotor and a clutch for coupling and uncoupling said driving wheel with said rotor, said clutch comprises a follower member mounted coaxially with said driving wheel whereby said follower member is axially displaceable into and out of engagement with said driving wheel and is rotatably fixed to said rotor, a thrust bearing carried by said follower member and having a cap, a spring biassing said follower member out of engagement with said driving wheel, a movable cover operatively connected to said thrust bearing cap, a fixed part defining with the movable cover an enclosed chamber, and a connection for the supply of pneumatic pressure to said chamber for operating said clutch.

2. A vane pump as claimed in claim 1, wherein said driving wheel being adapted to be driven from an external drive unit, and said housing at said one driving end thereof comprises an end portion of split construction defining a junction at which there is formed a lateral wheel and said external drive unit.

3. The vane pump as claimed in claim 2, wherein said split driving end portion of said housing includes a releasable bracket which overlaps said corresponding end of said rotor from the outside towards the inside of said rotor.

4. The vane pump as claimed in claim 1, including at least two separating walls spaced apart in the axial direction of said pump chamber and dividing said pump chamber into at least three sections externally of said rotor.

5. The vane pump as claimed in claim 4, wherein said at least three sections of said pump chamber are served by different fluid inlets and outlets.

6. The vane pump as claimed in claim 1, wherein said vanes of said vane shaft are divided into axially separated groups of vanes angularly displaced with respect to each other about said axis of said vane shaft.

7. The vane pump as claimed in claim 1 wherein said rotor includes integrated packing strip guide means adjacent said vane opening in said cylindrical wall.

8. The vane pump as claimed in claim 1, wherein said follower member is rotatably fixed to said rotor by means of axially extending pins carried by one of said follower member and said rotor, and axial bores in the other one of said follower member and said rotor slidably receiving said pins.

9. The vane pump as claimed in claim 1, wherein said movable cover is operatively connected to said thrust bearing cap by means of a lever acting between said cover and said cap.

10. The vane pump as claimed in claim 1, wherein said movable cover is rigidly connected to said thrust bearing cap.

11. The vane pump as claimed in claim 1, wherein said cover is provided with a recess, and said pneumatic pressure supply connection comprises a nozzle situated in said recess.

12. The vane pump as claimed in claim 1, including a flexible flat membrane interposed between said cover and said fixed part to seal said chamber.

13. The vane pump as claimed in claim 1, wherein said spring acts on said follower member in the opposite direction to the force exerted by the pneumatic pressure supplied to said chamber.

* * * * *